(12) United States Patent
Hatano

(10) Patent No.: US 6,560,032 B2
(45) Date of Patent: May 6, 2003

(54) LIQUID IMMERSION LENS SYSTEM AND OPTICAL APPARATUS USING THE SAME

(75) Inventor: Hitoshi Hatano, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 20 days.

(21) Appl. No.: 09/808,956

(22) Filed: Mar. 16, 2001

(65) Prior Publication Data

US 2001/0043404 A1 Nov. 22, 2001

(30) Foreign Application Priority Data

Mar. 27, 2000 (JP) ........................................ 2000-086226

(51) Int. Cl.[7] .............................................. G02B 21/02
(52) U.S. Cl. ...................... 359/656; 359/657; 359/658; 359/659; 359/660; 359/661
(58) Field of Search ................... 359/656–661

(56) References Cited

U.S. PATENT DOCUMENTS

| 5,798,869 | A | * | 8/1998 | Watanabe | 359/658 |
| 5,889,617 | A | * | 3/1999 | Yamada et al. | 359/657 |
| 5,898,524 | A | * | 4/1999 | Ryzhikov | 359/657 |
| 5,978,147 | A | * | 11/1999 | Kudo | 359/656 |
| 5,982,559 | A | * | 11/1999 | Furutake | 359/656 |

* cited by examiner

*Primary Examiner*—Loha Ben
*Assistant Examiner*—M. Hasan
(74) *Attorney, Agent, or Firm*—Pillsbury Winthrop LLP

(57) ABSTRACT

A low magnification liquid immersion objective lens system uses an immersion liquid having a refractive index for the d-line within a range defined by a condition (1) shown below, and has a magnification β and a working distance WDL which satisfy the following conditions (2) and (3):

$1.34 \leq ND \leq 1.80$ (1)

$\beta \leq 15$ (2)

$WDL \leq 0.35$ mm. (3)

6 Claims, 6 Drawing Sheets

LIQUID IMMERSION LENS SYSTEM AND OPTICAL APPARATUS USING THE SAME

BACKGROUND OF THE INVENTION a) Field of the Invention

The present invention relates to a liquid immersion objective lens system having a low magnification, for example, a liquid immersion objective lens system for microscopes. Furthermore, the present invention relates also to an optical apparatus using the liquid immersion objective lens system having the low magnification, for example, a form observing apparatus such as a microscope or a measuring apparatus such as a site meter.

b) Description of the Prior Art

Objective lens system having high magnifications of 40× to 100× are used for observing chromosomes and genes in cells which are minute objects. Measuring apparatuses such as a site meter may use objective lens systems which have low magnifications around 20×. Furthermore, objective lens systems of this kind are mostly liquid immersion objective lens systems since these lens systems must have large NAs to maintain required brightness and resolution. Furthermore, objective lens systems having low magnifications are frequently used to search for the above described objects to be observed.

When a minute object is observed with a liquid immersion objective lens system and then another object to be observed is to be searched again with an objective lens system having a low magnification, it is necessary to wipe off a liquid from a specimen each time, whereby a working efficiency is lowered remarkably. When the liquid is not wiped off, there occurs a defect such as degradation of an image of an observed object or adhesion of the liquid to a tip of the objective lens system having the low magnification, thereby resulting in lowering of a quality of an apparatus. Lowering of the working efficiency or the quality is not preferable for an automatic inspection apparatus in particular.

SUMMARY OF THE INVENTION

An object of the present invention is to provide a liquid immersion objective lens system which uses an immersion liquid having a refractive index ND for the d-line (587.6 nm) of a value within a range defined by a condition (1) shown below, and satisfies the following conditions (2) and (3):

$$1.34 \leq ND \leq 1.80 \tag{1}$$

$$\beta \leq 15 \tag{2}$$

$$WDL \leq 0.35 \text{ mm} \tag{3}$$

Another object of the present invention is to provide an optical apparatus which comprises a plurality of objective lens systems and observing means, wherein the objective lens systems include a liquid immersion objective lens system having a magnification not higher than 15× and a liquid immersion objective lens system having a magnification not lower than 15×, and an immersion liquid has a refractive index ND for the d-line satisfying the following condition (1):

$$1.34 \leq ND \times 1.80 \tag{1}$$

DETAILED DESCRIPTION OF THE PREFERRED EMBODIMENTS

Figure 1:
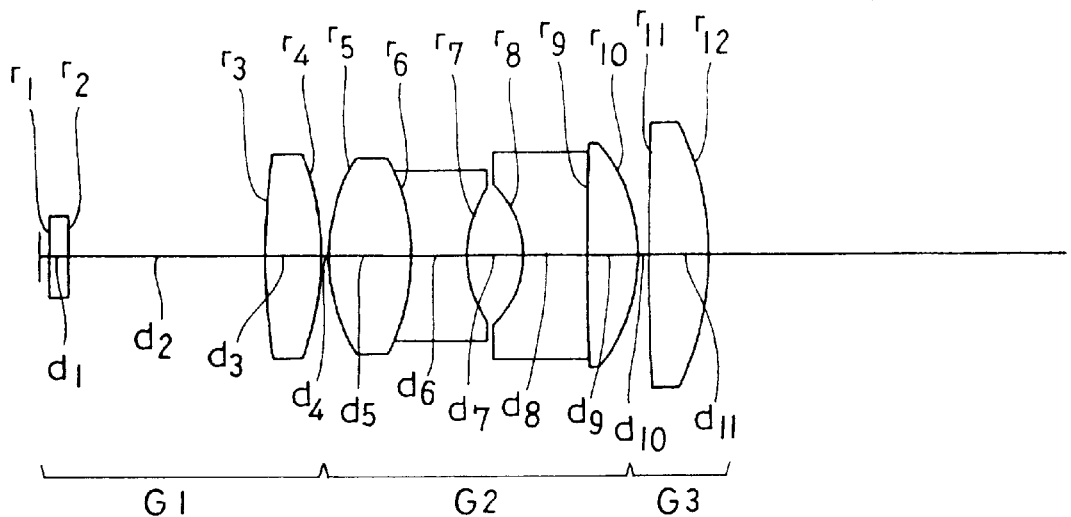
FIG. 1 through FIG. 6 are sectional views showing compositions of first through sixth embodiments of the liquid immersion objective lens system having a low magnification according to the present invention.

When a refractive index for the d-line (587.6 nm) is represented by ND, a liquid immersion objective lens system having a first composition which is a fundamental composition of the objective lens system according to the present invention uses an immersion liquid having ND within a range defined by a condition (1) shown below, and a magnification $\beta$ and a working distance WDL of the objective lens system satisfy the following conditions (2) and (3) respectively:

$$1.34 \leq ND \leq 1.80 \tag{1}$$

$$\beta \leq 15 \tag{2}$$

$$WDL \leq 0.35 \text{ mm} \tag{3}$$

The objective lens system which has the first composition according to the present invention is a liquid immersion objective lens system having a low magnification and the condition (1) defines a refractive index appropriate for an immersion liquid to be used in the liquid immersion objective lens system having the low magnification. If a lower limit of 1.34 of the condition (1) is exceeded, an objective lens system having a high magnification will be incapable of having a sufficient NA, thereby lowering brightness and resolution. If an upper limit of 1.80 of the condition (1) is exceeded, in contrast, it will be difficult to design an objective lens system which has a high magnification and a large numerical aperture. Furthermore, immersion liquids which have refractive indices exceeding the upper limit of the condition (1) are mostly highly poisonous and not preferable.

The condition (2) defines a magnification appropriate for the liquid immersion objective lens system having the low magnification. If an upper limits of 15 of the condition (2) is exceeded, an observing visual field will be too narrow for screening.

The condition (3) defines a working distance appropriate for the liquid immersion objective lens system. If an upper limit of 0.35 mm of the condition (3) is exceeded, a working distance will be long and an amount of the immersion liquid will be large, thereby degrading an image due to ununiformity and a fluidity of the immersion liquid. Furthermore, there will be liable to occur a phenomenon that the immersion liquid flows from between the objective lens system and a specimen, whereby a working efficiency and a quality may be lowered. Furthermore, a large amount of the immersion liquid make it difficult to clean a tip of the objective lens system and the like. Though it is possible to lower an occurring frequency of defects described above when the condition (3) is satisfied, it is preferable for secure prevention of the above described defects to define an upper limit of the condition (3) as 0.30 mm and satisfy, in place of the condition (3), the following condition (3-1):

$$WDL \leq 0.3 \text{ mm} \tag{3-1}$$

A liquid immersion objective lens system which has a second composition according to the present invention is a liquid immersion objective lens system which comprises a first lens unit having positive refractive power and at least a lens unit, and satisfies a condition (4) shown below in addition to the above described conditions (1), (2) and (3). That is, the objective lens system which has the second composition according to the present invention satisfies the following conditions (1), (2), (3) and (4):

$$1.34 \leq ND \leq 1.80 \tag{1}$$

$$\beta \leq 15 \tag{2}$$

$$WDL \leq 0.35 \text{ mm} \tag{3}$$

$$|f\beta/fG1| \leq 40 \tag{4}$$

wherein a reference symbol fG1 represents a focal length of the first lens unit, a reference symbol β designates a magnification of the objective lens system and a reference symbol f denotes a focal length of the objective lens system.

If an upper limit of the condition (4) is exceeded, power will be concentrated on the first lens unit, thereby undesirably making it impossible to correct aberrations favorably.

A liquid immersion objective lens system which has a third composition according to the present invention is a liquid immersion objective lens system comprising, in order from the object side, a first lens unit having positive refractive power, a second lens unit having negative refractive power and a third lens unit having positive refractive power, and satisfying a condition (5) shown below in addition to the conditions (1), (2) and (3). That is, the liquid immersion objective lens system having the third composition satisfies the following conditions (1), (2), (3) and (5):

$$1.34 \leq ND \leq 1.80 \tag{1}$$

$$\beta \leq 15 \tag{2}$$

$$WDL \leq 0.35 \text{ mm} \tag{3}$$

$$|fG3/f| \leq 5 \tag{5}$$

wherein a reference symbol fG2 represents a focal length of the third lens unit and a reference symbol f designates a focal length of the objective lens system.

The objective lens system having the third composition according to the present invention can be a liquid immersion objective lens system having a low magnification which corrects chromatic aberration relatively favorably and has a relatively large NA. If an upper limit of the condition (5) is exceeded, power will be concentrated on the first lens unit and the second lens unit, thereby undesirably making it impossible to correct aberrations favorably.

A liquid immersion objective lens system having a fourth composition according to the present invention is a liquid immersion objective lens system comprising, in order from the object side, a first lens unit having positive refractive power and a second lens unit having positive refractive power, and satisfying a condition (6) shown below in addition to the conditions (1), (2) and (3). That is, the objective lens system having the fourth composition satisfies the following conditions (1), (2), (3) and (6):

$$1.34 \leq ND \leq 1.80 \tag{1}$$

$$\beta \leq 15 \tag{2}$$

$$WDL \leq 0.35 \text{ mm} \tag{3}$$

$$|fG2/f| \leq 5 \tag{6}$$

wherein a reference symbol fG2 represents a focal length of the second lens unit and a reference symbol f designates a focal length of the objective lens system.

The objective lens system having the fourth composition according to the present invention can be an inexpensive liquid immersion objective lens system which comprises a relatively small number of lens elements and has a low magnification. If an upper limit of 5 of the condition (6) is exceeded, power will be concentrated on the first lens unit, thereby undesirably making it impossible to correct aberrations favorably.

A liquid immersion objective lens system having a fifth composition according to the present invention is a liquid immersion objective lens system comprising, in order from the object side, a first lens unit having positive refractive power and a second lens unit having negative refractive power, and satisfying a condition (4-1) shown below in addition to the above described conditions (1), (2) and (3). That is, the objective lens system having the fifth composition satisfies the following conditions (1), (2), (3) and (4-1):

$$1.34 \leq ND \leq 1.80 \tag{1}$$

$$\beta \leq 15 \tag{2}$$

$$WDL \leq 0.35 \text{ mm} \tag{3}$$

$$|f\beta/fG1| \leq 20 \tag{4-1}$$

An objective lens system having the fifth composition can be an inexpensive liquid immersion objective lens system which comprises a relatively small number of lens elements and has a low magnification. If an upper limit of 20 of the condition (4-1) is exceeded, power will be concentrated on the first lens unit, thereby undesirably making it impossible to correct aberrations favorably.

Furthermore, it is desirable to dispose a plane parallel plate at an object side location which is brought into contact with an immersion liquid in each of the liquid immersion objective lens systems which have the first through fourth compositions. The plane parallel plate makes it possible to modify an existing objective lens system into the liquid immersion objective lens system according to the present invention relatively easily and obtain an inexpensive liquid immersion objective lens system.

Furthermore, an optical apparatus according to the present invention is an optical apparatus comprising an objective lens system and observing means, characterized by in that the apparatus comprises at least a liquid immersion objective lens system having a low magnification not higher than 15× and at least a liquid immersion objective lens system having a high magnification not lower than 15×, and that a refractive index ND of an immersion liquid for the d-line (587.6 nm) satisfies the following condition (1):

$$1.34 \leq ND \leq 1.80 \tag{1}$$

The condition (1) defines a refractive index of an immersion liquid appropriate for the optical apparatus. If a lower limit of 1.34 of the condition (1) is exceeded, the objective lens system having the high magnification will be incapable of having a sufficient NA, thereby degrading brightness and resolution as described above. If an upper limit of 1.80 of the condition (1) is exceeded, in contrast, it will be difficult to design an objective lens system which has a high magnification and a large numerical aperture. Furthermore, most of substances which have refractive indices higher than the upper limit of the condition (1) are strongly poisonous and not preferable.

Furthermore, it is desirable that the liquid immersion objective systems to be used the optical apparatus according to the present invention satisfies the following conditions (3) and (7):

$$WDL \leq 0.35 \text{ mm} \quad (3)$$

$$WDL/WDH \leq 3.5 \quad (7)$$

wherein a reference symbol WDL represents a working distance of the objective lens system having the low magnification (unit: mm) and a reference symbol WDH designates a working distance of the objective lens system having the high magnification.

The condition (3) a working distance appropriate for the objective lens system having the low magnification and if an upper limit of the condition (3) is exceeded, a working distance will be long or an immersion liquid will be used in a large amount, whereby there is apt to occur a phenomenon that the immersion liquid is apt to flow out from between the objective lens system and a specimen, and a working efficiency and a quality may be degraded. Furthermore, the large amount of immersion liquid will make it difficult to clean a tip portion of the objective lens system and the like.

Though it is possible to lower a occurring frequency of defects described above when the above-mentioned condition (3) is satisfied, it is desirable for more secure suppression of the above described defects to satisfy, in place of the condition (3), the following condition (3-1).

$$WDL \leq 0.3 \text{ mm} \quad (3-1)$$

The condition (7) defines a ratio between working distances of the liquid immersion objective lens system having the low magnification and the liquid immersion objective lens system having the high magnification appropriate for the optical apparatus and if an upper limit of 3.5 of the condition (7) is exceeded, a difference between working distances of two or more objective lens system will be large. In other words, a required amount of the immersion liquid will be large, whereby there is liable to occur a phenomenon that the immersion liquid flows out from between the objective lens system and a specimen when the objective lens system is exchanged, and a working efficiency and a quality may be degraded.

Though it is possible to lower a occurring frequency of defects described above when the condition (7) is satisfied, it is desirable for more secure prevention of the above described defects to satisfy, in place of the condition (7), the following condition (7-1):

$$WDL/WDH \leq 3 \quad (7-1)$$

Furthermore, it is desirable for each of the above described inventions that the immersion liquid is an immersion liquid oil for microscopes.

The immersion oil for microscopes is an immersion oil for microscopes which is specified by International Standard Organization (ISO 8036/1-1986) or Japanese Industrial Standard (JIS K 2400).

FIG. 1 is a sectional view showing a composition of a liquid immersion objective lens system according to a first embodiment of the present invention. The first embodiment has numeral data listed below, wherein a reference symbol f represents a focal length, a reference symbol β designates a magnification, a reference symbol WD denotes a working distance, a reference symbol NA represents a numerical aperture and a reference symbol ND designates a refractive index of an immersion liquid for the d-line (587.6 nm).

First embodiment f = 7.99 mm, β = 10x, WD = 0.2855 mm, NA = 0.31
Thickness of cover glass = 0.17 mm
ND = 1.51548

| | | |
|---|---|---|
| $r_1 = \infty$ | | |
| $d_1 = 0.8459$ | $n_1 = 1.50378$ | $v_1 = 66.81$ |
| $r_2 = \infty$ | | |
| $d_2 = 8.9802$ | | |
| $r_3 = 30.8161$ | | |
| $d_3 = 2.5494$ | $n_2 = 1.77250$ | $v_2 = 49.60$ |
| $r_4 = -12.4816$ | | |
| $d_4 = 0.3477$ | | |
| $r_5 = 8.2737$ | | |
| $d_5 = 3.8104$ | $n_3 = 1.61800$ | $v_3 = 63.39$ |
| $r_6 = -9.3043$ | | |
| $d_6 = 2.5599$ | $n_4 = 1.71850$ | $v_4 = 33.52$ |
| $r_7 = 5.4123$ | | |
| $d_7 = 2.5870$ | | |
| $r_8 = -4.2411$ | | |
| $d_8 = 2.9496$ | $n_5 = 1.67650$ | $v_5 = 37.54$ |
| $r_9 = 183.4263$ | | |
| $d_9 = 2.3891$ | $n_6 = 1.49700$ | $v_6 = 81.61$ |
| $r_{10} = -7.7748$ | | |
| $d_{10} = 0.4974$ | | |
| $r_{11} = 164.3235$ | | |
| $d_{11} = 2.7963$ | $n_7 = 1.63930$ | $v_7 = 44.88$ |
| $r_{12} = -13.0337$ | | |
| $|f \cdot \beta/fG1| = 15.25$ | | |
| $|fG3/f| = 1.06$ | | |
| $fG1 = 11.8$ | | |
| $fG2 = -13.44$ | | |
| $fG3 = 19.01$ | | |

The objective lens system according to the above described first embodiment comprises a first lens unit G1 having positive refractive power, a second lens unit having negative refractive power and a third lens unit G3 having positive refractive power, and uses an immersion liquid which has the refractive index ND of 1.51548 satisfying the condition (1). Furthermore, the magnification β and the working distance WDL are 10× and 0.285 mm which satisfy the conditions (2), (3) and (3-1) respectively. Furthermore, the first lens unit G1 and the third lens unit G3 satisfies the conditions (4) and (5) respectively. In addition, the objective lens system according to the first embodiment satisfies the condition (4-1) for an objective lens system which consists of a first lens unit having positive refractive power and a second lens unit having negative refractive power, as well as the condition (6) for an objective lens system which consists of a first lens unit having positive refractive power and a second lens unit having positive refractive power.

Figure 2:
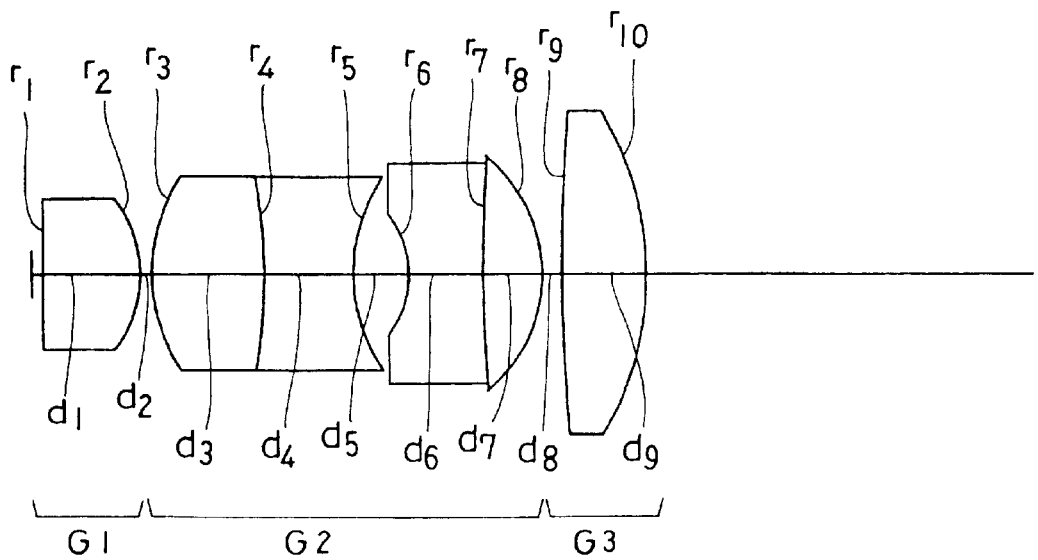

An objective lens system according to a second embodiment of the present invention has a composition shown in FIG. 2 and numerical data which is listed below:

Second Embodiment f = 18 mm, β = 10x, WD = 0.346 mm, NA = 0.33
Thickness of cover glass = 0.17 mm
ND = 1.51548

-continued

Second Embodiment $r_1 = -775.5142$
  $d_1 = 4.4460$    $n_1 = 1.77250$    $v_1 = 49.60$
$r_2 = -5.8061$
  $d_2 = 0.5301$
$r_3 = 8.3166$
  $d_3 = 5.1434$    $n_2 = 1.61800$    $v_2 = 63.39$
$r_4 = -25.8718$
  $d_4 = 4.1037$    $n_3 = 1.71850$    $v_3 = 33.52$
$r_5 = 8.1635$
  $d_5 = 2.5438$
$r_6 = -4.6905$
  $d_6 = 3.4168$    $n_4 = 1.67650$    $v_4 = 37.54$
$r_7 = 68.5783$
  $d_7 = 2.7532$    $n_5 = 1.49700$    $v_5 = 81.61$
$r_8 = -6.9731$
  $d_8 = 0.9058$
$r_9 = 82.5541$
  $d_9 = 3.9542$    $n_6 = 1.63930$    $v_6 = 44.88$
$r_{10} = -14.6425$
$|f \cdot \beta / fG1| = 23.8411$
$|fG3/f| = 1.0981$
$fG1 = 7.55$
$fG2 = -175$
$fG3 = 19.77$ The objective lens system according to the second embodiment comprises a first lens unit G1 having positive refractive power, a second lens unit G2 having negative refractive power and a third lens unit G3 having positive refractive power, and satisfies the conditions (1), (2) and (3) as well as the conditions (4) and (5) like the objective lens system according to the first embodiment.

Figure 3:
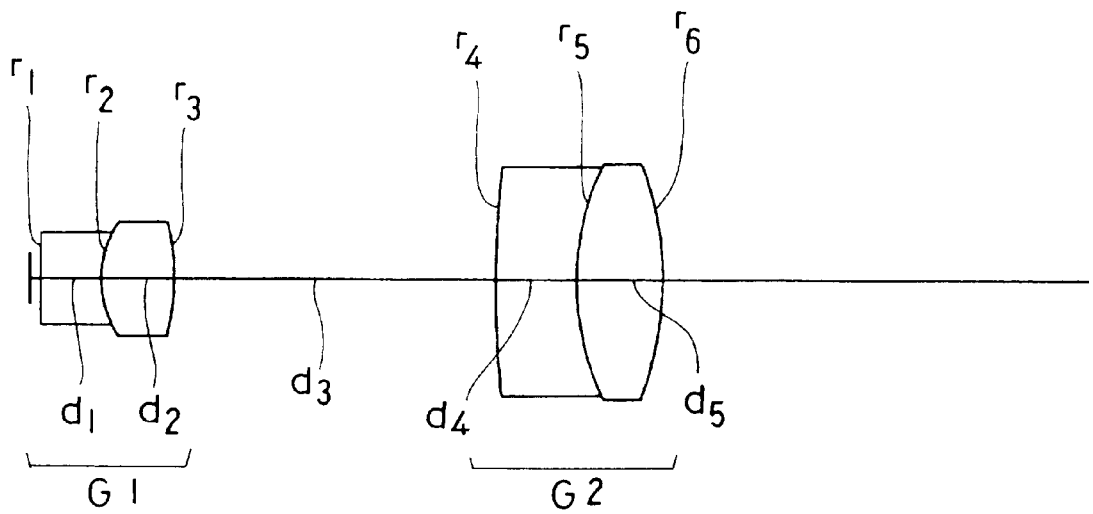

A liquid immersion objective lens system according to a third embodiment of the present invention has a composition shown in FIG. 3.

Third Embodiment $f = 17.96$ mm, $\beta = 10x$, WD = 0.294 mm, NA = 0.25
Thickness of cover glass = 0.17 mm
ND = 1.51548
$r_1 = 100.0000$
  $d_1 = 2.6191$    $n_1 = 1.83400$    $v_1 = 37.17$
$r_2 = 4.3675$
  $d_2 = 3.1074$    $n_2 = 1.66755$    $v_2 = 41.93$
$r_3 = -10.2914$
  $d_3 = 13.7427$
$r_4 = 47.0615$
  $d_4 = 3.4826$    $n_3 = 1.75520$    $v_3 = 27.51$
$r_5 = 11.1590$
  $d_5 = 3.6828$    $n_4 = 1.61484$    $v_4 = 51.17$
$r_6 = -14.0632$
$|f \cdot \beta / fG1| = 6.88$
$|fG2/f| = 1.22$
$fG1 = 26.1$
$fG2 = 21.83$ The objective lens system according to the third embodiment comprises a first lens unit having positive refractive power and a second lens unit G2 having positive refractive power.

The objective lens system according to the third embodiment satisfies the conditions (1), (2), (3), (3-1), (4) and (6).

Figure 4:
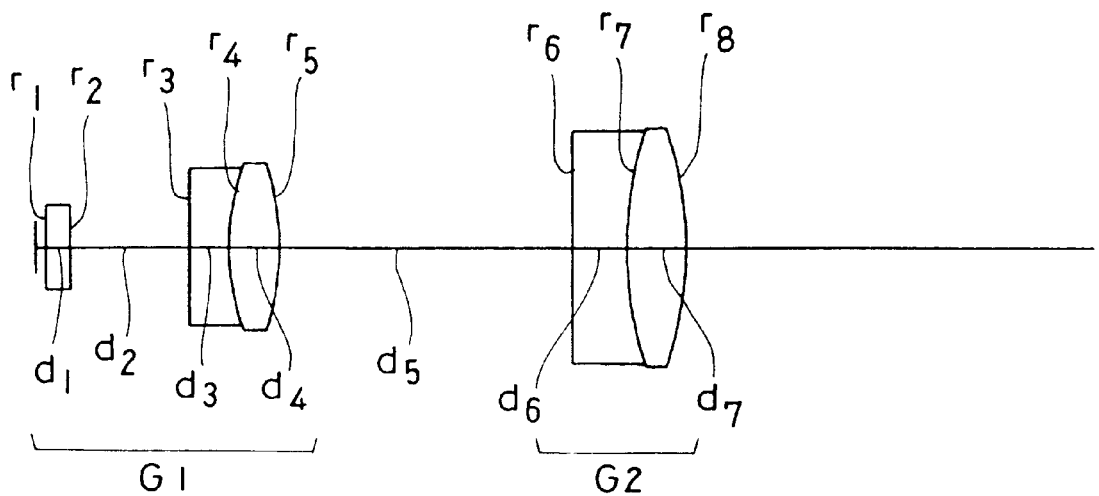

An objective lens system according to a fourth embodiment of the present invention has a composition shown in FIG. 4.

The objective lens system according to the fourth embodiment has numerical data which is listed below:

Fourth Embodiment $f = 17.99$ mm, $\beta = 10x$, WD = 0.279 mm, NA = 0.25
Thickness of cover glass = 0.17 mm
ND = 1.51548
$r_1 = \infty$
  $d_1 = 1.0128$    $n_1 = 1.51633$    $v_1 = 64.14$
$r_2 = \infty$
  $d_2 = 5.1121$
$r_3 = -3339.7298$
  $d_3 = 1.6867$    $n_2 = 1.83400$    $v_2 = 37.17$
$r_4 = 9.7966$
  $d_4 = 2.1687$    $n_3 = 1.66755$    $v_3 = 41.93$
$r_5 = -10.6990$
  $d_5 = 12.5815$
$r_6 = -255.7180$
  $d_6 = 2.3210$    $n_4 = 1.75520$    $v_4 = 27.51$
$r_7 = 16.4779$
  $d_7 = 2.5360$    $n_5 = 0 1.61484$    $v_5 = 51.17$
$r_8 = -14.1284$
$|f \cdot \beta / fG1| = 8.38$
$|fG2/f| = 1.69$
$fG1 = 21.48$
$fG2 = 30.33$ Like the objective lens system according to the third embodiment, the objective lens system according to the fourth embodiment comprises a first lens unit and a second lens unit both having positive refractive power, and satisfies the conditions (1), (2), (3), (3-1), (4) and (6).

Figure 5:
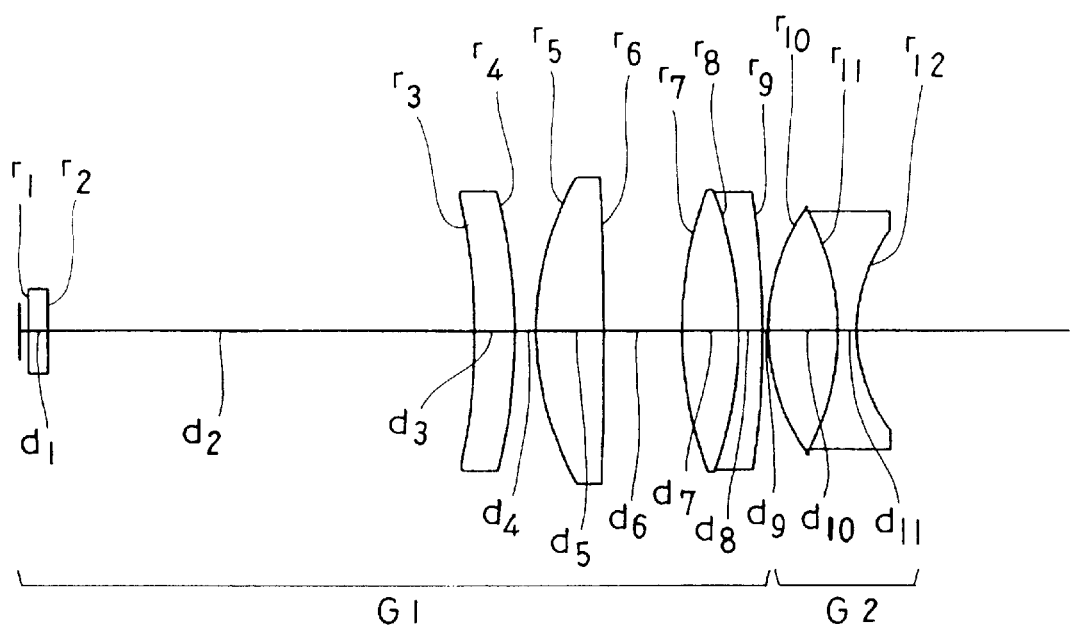

A liquid immersion objective lens system according to a fifth embodiment of the present invention has a composition shown in FIG. 5 and numeral data which is listed below:

Fifth Embodiment $f = 18$ mm, $\beta = 10x$, WD = 0.276 mm, NA = 0.2
Thickness of cover glass = 0.17 mm
ND = 1.51548
$r_1 = \infty$
  $d_1 = 0.8974$    $n_1 = 1.50378$    $v_1 = 66.81$
$r_2 = \infty$
  $d_2 = 20.1063$
$r_3 = -30.4347$
  $d_3 = 1.8801$    $n_2 = 1.77250$    $v_2 = 49.60$
$r_4 = -27.4068$
  $d_4 = 0.9784$
$r_5 = 14.7418$
  $d_5 = 3.1933$    $n_3 = 1.49700$    $v_3 = 81.61$
$r_6 = -168.5690$
  $d_6 = 3.6588$
$r_7 = 19.2119$
  $d_7 = 2.6501$    $n_4 = 1.49700$    $v_4 = 81.61$
$r_8 = -19.6110$
  $d_8 = 1.0 948$    $n_5 = 1.83400$    $v_5 = 37.17$
$r_9 = 46.7650$
  $d_9 = 0.2487$
$r_{10} = 10.0980$
  $d_{10} = 3.2896$    $n_6 = 1.49700$    $v_6 = 81.61$
$r_{11} = -12.0664$
  $d_{11} = 0.8865$    $n_7 = 1.64450$    $v_7 = 40.82$
$r_{12} = 7.8585$
$|f \cdot \beta / fG1| = 11.03$
$fG1 = 16.32$
$fG2 = 30.18$ The objective lens system according to the fifth embodiment comprises a first lens unit G1 having positive refractive power and a second lens unit G2 having negative refractive power. The objective lens system according to the fifth embodiment satisfies the conditions (1), (2), (3) and (3-1) as well as the conditions (4) and (4-1). Furthermore, the objective lens system satisfies the condition (6) for an objective lens system which consists of a first lens unit having positive refractive power and a second lens unit having positive refractive power.

Each of the objective lens systems according to the first through fifth embodiments is an objective lens system is designed for focusing on an infinite distance.

Figure 6:
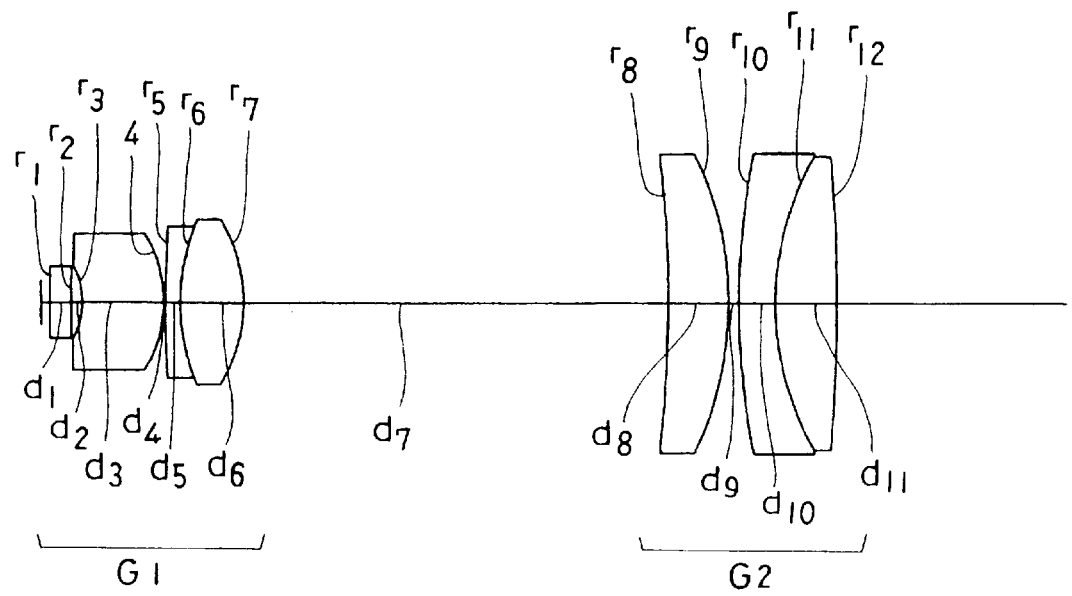

An objective lens system according to a sixth embodiment has a composition shown in FIG. 6 and numerical data which is listed below:

| Sixth Embodiment | | | |
|---|---|---|---|
| $f = 15.75$ mm, $\beta = 10x$, $WD = 0.261$ mm, $NA = 0.4$ | | | |
| Thickness of cover glass = 0.17 mm | | | |
| $ND = 1.51548$ | | | |
| $r_1 = \infty$ | | | |
| | $d_1 = 1.0016$ | $n_1 = 1.50378$ | $\nu_1 = 66.81$ |
| $r_2 = \infty$ | | | |
| | $d_2 = 0.5030$ | | |
| $r_3 = -3.5680$ | | | |
| | $d_3 = 3.8022$ | $n_2 = 1.61659$ | $\nu_2 = 36.63$ |
| $r_4 = -5.8244$ | | | |
| | $d_4 = 0.0821$ | | |
| $r_5 = 67.4687$ | | | |
| | $d_5 = 0.6899$ | $n_3 = 1.57957$ | $\nu_3 = 53.71$ |
| $r_6 = 9.4752$ | | | |
| | $d_6 = 3.0035$ | $n_4 = 1.43389$ | $\nu_4 = 95.15$ |
| $r_7 = -7.0917$ | | | |
| | $d_7 = 19.9995$ | | |
| $r_8 = -60.0985$ | | | |
| | $d_8 = 2.8006$ | $n_5 = 1.48749$ | $\nu_5 = 70.21$ |
| $r_9 = -15.9497$ | | | |
| | $d_9 = 0.4782$ | | |
| $r_{10} = 35.8620$ | | | |
| | $d_{10} = 1.7142$ | $n_6 = 1.61659$ | $\nu_6 = 36.63$ |
| $r_{11} = 13.6624$ | | | |
| | $d_{11} = 2.8903$ | $n_7 = 1.43389$ | $\nu_7 = 95.15$ |
| $r_{12} = -74.9246$ | | | |
| $|f \cdot \beta/fG1| = 9.02$ | | | |
| $|fG2/f| = 1.95$ | | | |
| $fG1 = 17.47$ | | | |
| $fG2 = 30.7$ | | | |

Like the objective lens systems according to the third and fourth embodiments, the objective lens system according to the sixth embodiment comprises a first and second lens units G1 and G2 both having positive refractive powers, and satisfies the conditions (1), (2), (3) and (3-1) as well as the conditions (4) and (6). This objective lens system satisfies also the condition (4-1) for an objective lens system which consists of a first lens system having positive refractive power and a second lens unit having negative refractive power.

The objective lens system according to the sixth embodiment is designed for focusing on an infinite distance.

Out of the objective lens systems according to the first through sixth embodiments, the objective lens systems according to the first, fourth, fifth and sixth embodiments use plane parallel plates as optical elements ($r_1$ to $r_2$) which are disposed on the object side to be brought into contact with an immersion liquid. Accordingly, the plane parallel plate makes it possible to modify an existing objective lens system having a low magnification relatively easily into an inexpensive liquid immersion objective lens system. Like the objective lens systems according to the second and third embodiments, for example, a lens element ($r_1$ to $r_2$) which has a planar surface on the object side may be disposed on the object side which is to be brought into contact with the immersion liquid.

In the numerical data listed above, reference symbols $r_1$, $r_2$, . . . represent radii of curvature on respective lens surfaces, reference symbols $d_1$, $d_2$, . . . designate thicknesses of respective lens elements and airspaces reserved therebetween, reference symbols $n_1$, $n_2$, . . . denotes refractive indices of the respective lens elements for the d-line, and reference symbols $\nu_1$, $\nu_2$ . . . represents Abbe's numbers of the respective lens element for the d-line. Furthermore, reference symbols f, $\beta$, WD and ND in the numerical data of the second through sixth embodiments designate focal lengths, magnifications, working distances, numerical apertures and refractive indices of immersion liquids for the d-line like those in the numerical data of the first embodiment.

Now, description will be made of embodiments of the optical apparatus according to the present invention.

Figure 7:
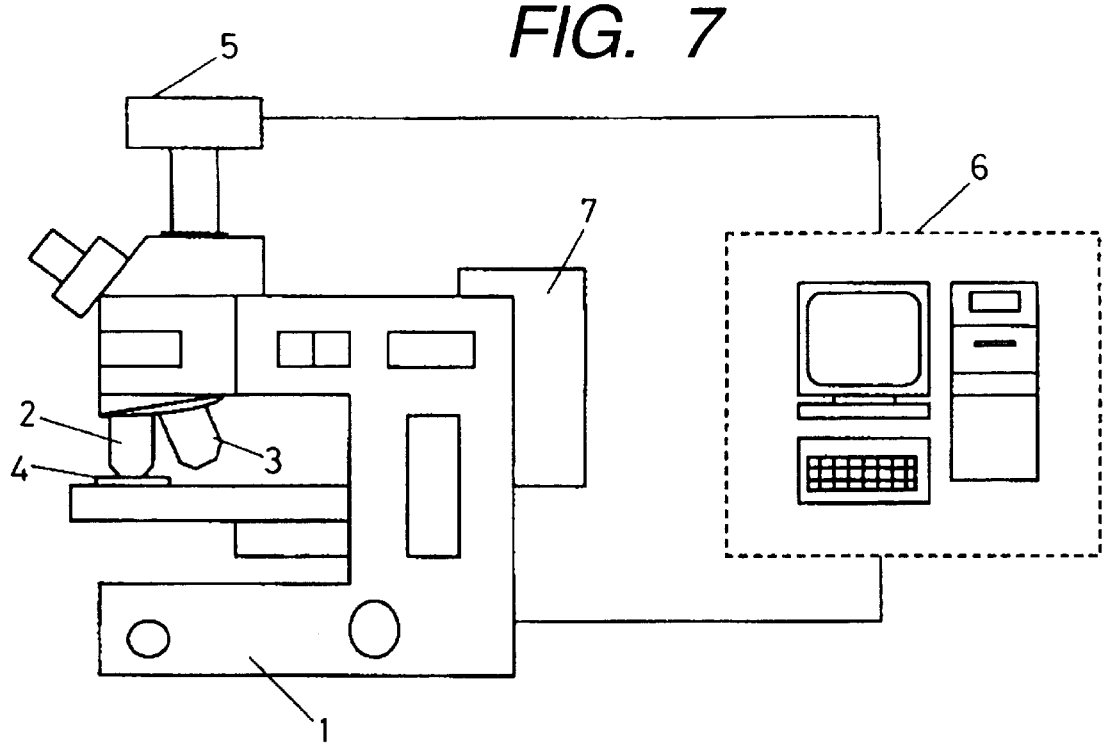
FIG. 7 through FIG. 9 are diagrams showing configurations of first through third embodiments of the optical apparatus according to the present invention.

FIG. 7 is a diagram showing a first embodiment of the optical apparatus according to the present invention. This optical apparatus comprises a low magnification liquid immersion objective lens system 2 and a high magnification liquid immersion objective lens system 3 which are attached to a microscope main body 1 as shown in FIG. 7. The optical apparatus shown in FIG. 7 uses, for example, the objective lens system according to any one of the above described first through fifth embodiments of the present invention as the low magnification liquid immersion objective lens system 2 and employs a first embodiment of a high magnification liquid immersion objective lens system having a composition shown in FIG. 10 described later as the high magnification liquid immersion objective lens system 3. A specimen 4 to be observed is preliminarily dyed with a fluorescent coloring matter. The specimen 4 is illuminated with a light source 7 and emits a fluorescence. A fluorescence image emitted from the specimen 4 is picked up with an image pickup camera 5 and recorded in the computer 6. Exchange between the low magnification liquid immersion objective lens system 2 and the high magnification liquid immersion objective lens system 3, an image pickup timing, and operations of the microscope main body 1 and the image pickup camera 5 are controlled by the computer 6.

The first embodiment of the optical apparatus according to the present invention searches for an object to be recorded while observing the specimen 4 with the low magnification liquid immersion objective lens system 2. When the object to be recorded is determined, the optical apparatus switches the low magnification liquid immersion objective lens system 2 to the high magnification liquid immersion objective lens system 3. After selecting the high magnification liquid immersion objective lens system 3, the optical apparatus picks up an image with the image pickup camera 5 and records an image pickup result in the computer 6. Then, the optical apparatus switches the high magnification liquid immersion objective lens system 3 to the low magnification liquid immersion objective lens system 2 and observes the specimen 4 once again to search for another object to be recorded.

The first embodiment of the optical apparatus according to the present invention does not require wiping off an immersion liquid from a specimen each time the objective lens systems are switched and can observe the specimen quickly.

Though the first embodiment of the optical apparatus according to the present invention controls the microscope main body 1 and the image pickup camera 5 with the computer 6, an optical apparatus which is configured to manually operate the microscope main body 1, for example, can also accomplish the object of the present invention.

Though the first embodiment of the optical apparatus according to the present invention uses the image pickup camera 5 as observing means, the optical apparatus may use an eyepiece as visual observing means.

Furthermore, the low magnification liquid immersion objective lens system 2 and the high magnification liquid immersion objective lens system 3 are attached, one each, to the microscope main body 1 in the first embodiment of the optical apparatus according to the present invention. However, the optical apparatus according to the present invention is sufficient so far as the apparatus comprises at least a low magnification liquid immersion objective lens system and at least a high magnification liquid immersion objective lens system, and may be an optical apparatus which comprises either or both of the low magnification liquid immersion objective lens system 2 and the high magnification objective lens system 3 in a plurality.

Though the optical apparatus according to the above described embodiment detects an image using the fluorescent coloring matter, the optical apparatus may be configured to detect an image using not the fluorescent coloring matter but a radioactive material. Furthermore, the optical apparatus may be configured to have the above described configuration and detect an image by a phase difference method, a differential interference detection method or a dark-field detection method.

Though the optical apparatus according to the above described embodiment has a configuration comprising a microscope, this configuration is not limitative and the optical apparatus is sufficient so far as the optical apparatus uses a low magnification liquid immersion objective lens system and a high magnification liquid immersion objective lens system which have the above described compositions. In other words, the object of the present invention can be accomplished by a cell measuring apparatus such as a site meter or a gene analyzer such as a micro array scanner which comprises the optical apparatus according to the present invention.

Figure 10:
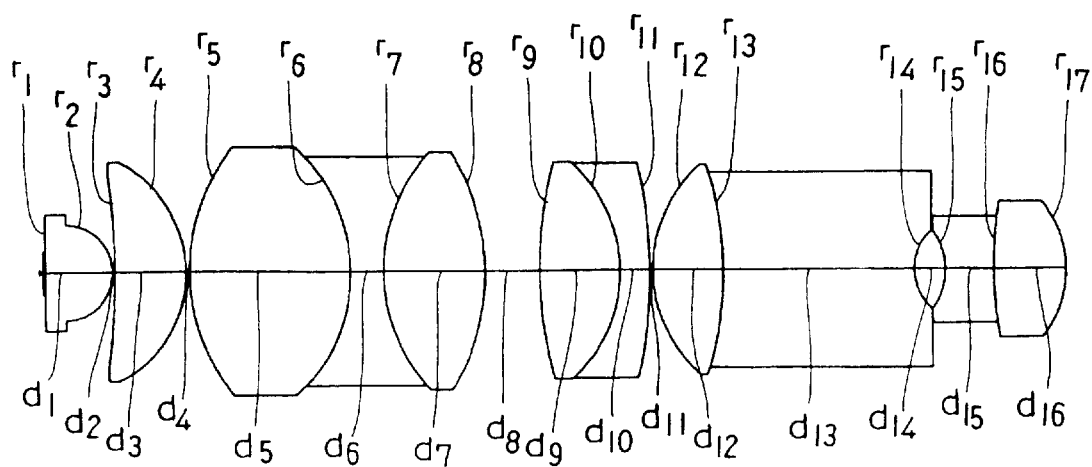
FIG. 10 and FIG. 11 are sectional views showing compositions of first and second embodiments of a liquid immersion objective lens system having a high magnification to be used in the optical apparatus according to the present invention.

FIG. 10 is a sectional view showing a first embodiment of the high magnification liquid immersion objective lens system used in the first embodiment of the present invention. Numerical data of the first embodiment of the high magnification liquid immersion objective lens system is listed below:

First embodiment of high magnification liquid immersion objective lens system f = 1.8 mm, β = 100x, WD = 0.132 mm, NA -= 1.30
Thickness of cover glass = 0.17 mm
ND = 1.51548
$r_1 = \infty$
  $d_1 = 3.2039$    $n_1 = 1.51633$    $v_1 = 64.15$
$r_2 = -2.2182$
  $d_2 = 0.1200$
$r_3 = -28.5740$
  $d_3 = 3.3718$    $n_2 = 1.56907$    $v_2 = 71.30$
$r_4 = -5.6832$
  $d_4 = 0.1800$
$r_5 = 9.1739$
  $d_5 = 7.6264$    $n_3 = 1.43389$    $v_3 = 95.15$
$r_6 = -7.6030$
  $d_6 = 1.5800$    $n_4 = 1.61340$    $v_4 = 43.84$
$r_7 = 8.2087$
  $d_7 = 4.8000$    $n_5 = 1.43389$    $v_5 = 95.15$
$r_8 = -10.2274$
  $d_8 = 2.6045$
$r_9 = 19.7320$
  $d_9 = 3.8000$    $n_6 = 1.43389$    $v_6 = 95.15$
$r_{10} = -6.6286$
  $d_{10} = 1.4000$    $n_7 = 1.78\ 650$    $v_7 = 50.00$
$r_{11} = -20.6157$
  $d_{11} = 0.1500$ -continued First embodiment of high magnification liquid immersion objective lens system $r_{12} = 6.5086$
  $d_{12} = 3.3200$    $n_8 = 1.56907$    $v_8 = 71.30$
$r_{13} = -15.2083$
  $d_{13} = 8.9523$    $n_9 = 1.69680$    $v_9 = 56.47$
$r_{14} = 2.3896$
  $d_{14} = 1.4800$
$r_{15} = -2.9839$
  $d_{15} = 2.2805$    $n_{10} = 1.69680$    $v_{10} = 56.47$
$r_{16} = 20.1507$
  $d_{16} = 3.3886$    $n_{11} = 1.59551$    $v_{11} = 39.21$
$r_{17} = -4.9409$
  WDL/WDH ≦ 2.62

The first embodiment of the high magnification liquid immersion objective lens system is designed for focusing on an infinite distance.

The first through fifth embodiments which are the low magnification liquid immersion objective lens systems and the first embodiment of the high magnification liquid immersion objective lens system are objective lens systems designed for focusing on the infinite distance as described above which allow parallel rays to emerge and do not image the rays by themselves. Accordingly, these objective lens systems are used in combination with an imaging lens system which has a composition shown in FIG. 12 and numerical data listed below. Magnifications of these objective lens systems according to the embodiments are specified as those obtained by combining the objective lens systems with the imaging lens system described below:

$r_1 = 68.7541$
  $d_1 = 7.7321$    $n_1 = 1.48749$    $v_1 = 70.23$
$r_2 = -37.5679$
  $d_2 = 3.4742$    $n_2 = 1.80610$    $v_2 = 40.92$
$r_3 = -102.8477$
  $d_3 = 0.6973$
$r_4 = 84.3099$
  $d_4 = 6.0238$    $n_3 = 1.83400$    $v_3 = 37.16$
$r_5 = -50.7100$
  $d_5 = 3.0298$    $n_4 = 1.64450$    $v_4 = 40.82$
$r_6 = 40.6619$

An immersion liquid of the low magnification liquid immersion objective lens system and the high magnification liquid immersion objective lens system which are used in the first embodiment of the optical apparatus according to the present invention has a refractive index ND satisfying the condition (1). Furthermore, these objective lens system satisfy the condition (3), the condition (7) and the condition (7-1).

Figure 8:
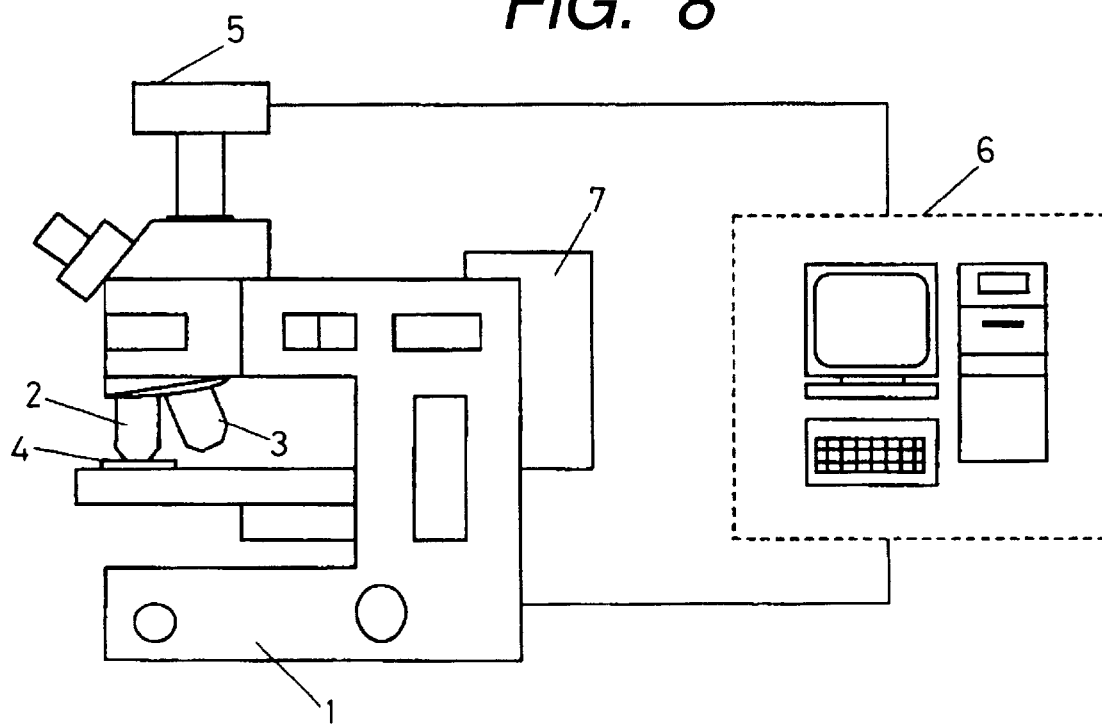

FIG. 8 is a diagram showing a second embodiment of the optical apparatus according to the present invention. In FIG. 8, a low magnification liquid immersion objective lens system 2 and a high magnification liquid immersion objective lens system 3 are attached to a microscope main body 1. The objective lens system according to the sixth embodiment, for example, is used as the low magnification liquid immersion objective lens system 2 and a second embodiment (FIG. 11) of a high magnification liquid immersion objective lens system described later, for example, is used as the high magnification liquid immersion objective lens system 3.

In the optical apparatus according to the second embodiment, a specimen 4 to be observed is preliminarily dyed with a fluorescent coloring matter. The specimen 4 is illuminated with a light source 7 and emits a fluorescence. An fluorescence image emitted from the specimen 4 is picked up by an image pickup camera 5 and recorded in a computer 6. Switching between the low magnification liquid immersion objective lens system 2 and the high magnification liquid immersion objective lens system 3, an image pickup timing, and operations of the microscope main body 1 and the image pickup camera 5 are controlled by the computer 6.

The optical apparatus according to the second embodiment first observes the specimen 4 with the low magnification liquid immersion objective lens system 2 to search for an object to be recorded. When the object to be recorded is determined, the optical apparatus switches the low magnification liquid immersion objective lens system 2 to the high magnification liquid immersion objective lens system 3, picks up an image with the image pickup camera 5 and record an image pickup result in the computer 6. Then, the optical apparatus switches the high magnification liquid immersion objective lens system 3 to the low magnification liquid immersion objective lens system 2 and observes the specimen once again to search for another object to be recorded.

The optical apparatus according to the second embodiment does not require wiping off an immersion liquid each time the objective lens systems are switched and can observe a specimen quickly.

Though the optical apparatus according to the second embodiment controls the microscope main body 1 and the image pickup camera 5 with the computer 6, the optical apparatus may be configured, for example, to manually operate the microscope main body.

Though the optical apparatus according to the second embodiment also uses the image pickup camera 5 as observing means, the optical apparatus may use an eyepiece as visual observing means.

Though the optical apparatus according to the second embodiment shown in FIG. 8 uses the low magnification liquid immersion objective lens system 2 and the high magnification liquid immersion objective lens system 3 which are attached, one each, to the microscope main body 1, it is sufficient for the optical apparatus to comprise at least the low magnification liquid immersion objective lens system 2 and at least the high magnification liquid immersion objective lens system 3, and the optical apparatus may comprise either or both of the low magnification liquid immersion objective lens system 2 and the high magnification liquid immersion objective lens system 3 in a plurality.

Though the optical apparatus according to the second embodiment uses the fluorescent coloring matter for detecting an image, the optical apparatus may use a radioactive material for detecting an image. The optical apparatus may be configured to detect an image by the phase difference method, the differential interference method or the dark-field detection method.

Furthermore, the optical apparatus according to the above described embodiment comprises a microscope. However, the object of the present invention can be accomplished by a cell measuring apparatus such as a site meter or a gene analyzer such as a micro array scanner which uses the optical apparatus according to the present invention.

Figure 11:
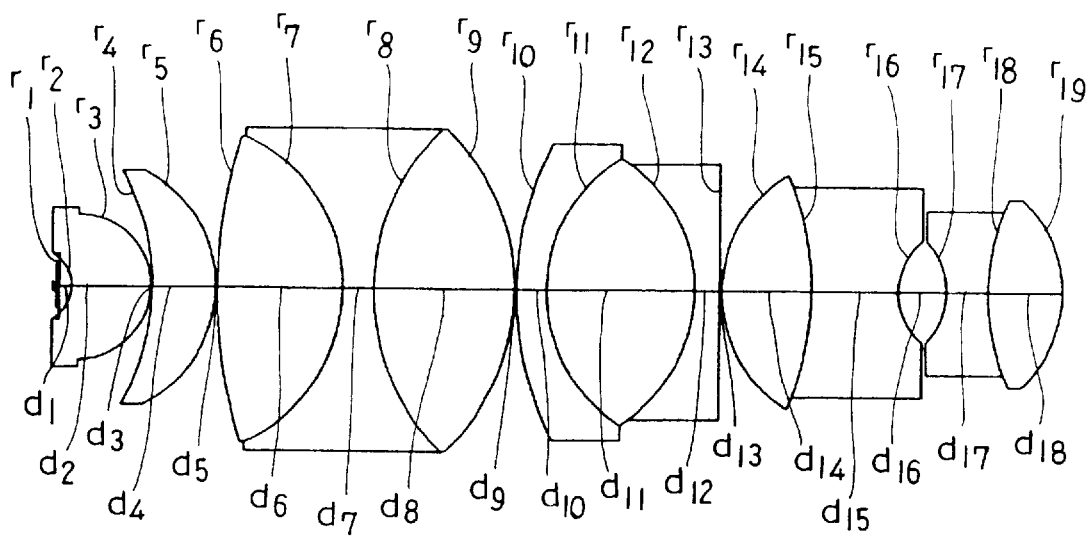

FIG. 11 is a sectional view showing a second embodiment of the high magnification liquid immersion objective lens system which is to be used in the optical system according to the present invention having a second configuration and has the following numerical data:

Second embodiment of the high magnification liquid immersion objective lens system $f = 2.79$ mm, $\beta = 60x$, WD $= 0.141$ mm, NA $= 1.40$
Thickness of cover glass $= 0.17$ mm
ND $= 1.51548$
$r_1 = \infty$
$\quad d_1 = 0.5907 \quad n_1 = 1.51633 \quad \nu_1 = 64.15$
$r_2 = -1.7503$
$\quad d_2 = 3.7352 \quad n_2 = 1.88300 \quad \nu_2 = 40.78$
$r_3 = -3.4197$
$\quad d_3 = 0.0810$
$r_4 = -11.3443$
$\quad d_4 = 3.0042 \quad n_3 = 1.61700 \quad \nu_3 = 62.80$
$r_5 = -6.1920$
$\quad d_5 = 0.0983$
$r_6 = 23.8819$
$\quad d_6 = 6.0081 \quad n_4 = 1.65830 \quad \nu_4 = 57.33$
$r_7 = -7.9253$
$\quad d_7 = 1.5113 \quad n_5 = 1.65412 \quad \nu_5 = 39.70$
$r_8 = 10.5617$
$\quad d_8 = 6.7080 \quad n_6 = 1.43389 \quad \nu_6 = 95.15$
$r_9 = -10.6250$
$\quad d_9 = 0.1200$
$r_{10} = 15.5102$
$\quad d_{10} = 1.4027 \quad n_7 = 1.61340 \quad \nu_7 = 43.84$
$r_{11} = 7.3882$
$\quad d_{11} = 7.0111 \quad n_8 = 1.43389 \quad \nu_8 = 95.15$
$r_{12} = -7.4278$
$\quad d_{12} = 1.1831 \quad n_9 = 1.52682 \quad \nu_9 = 51.13$
$r_{13} = -12270.0000$
$\quad d_{13} = 0.1024$
$r_{14} = 6.4196$
$\quad d_{14} = 4.3074 \quad n_{10} = 1.49700 \quad \nu_{10} = 81.61$
$r_{15} = -14.1265$
$\quad d_{15} = 4.0078 \quad n_{11} = 1.52682 \quad \nu_{11} = 51.13$
$r_{16} = 3.1896$
$\quad d_{16} = 2.2048$
$r_{17} = -3.5474$
$\quad d_{17} = 2.0011 \quad n_{12} = 1.81554 \quad \nu_{12} = 44.36$
$r_{18} = 10.7669$
$\quad d_{18} = 3.5250 \quad n_{13} = 1.74950 \quad \nu_{13} = 35.27$
$r_{19} = -6.0653$
WDL/WDH $\leq 2.45$ This high magnification liquid immersion objective lens system is an objective lens system designed for focusing on an infinite distance.

The second embodiment of the optical apparatus according to the present invention also satisfies the conditions (1) and (2) as well as the conditions (7) and (7-1).

In the numerical data listed above, reference symbols $r_1$, $r_2$, ... represent radii of curvature on respective lens surfaces, reference symbols $d_1$, $d_2$, ... designate thicknesses of respective lens elements and airspaces reserved therebetween, reference symbols $n_1$, $n_2$, ... denote refractive indices of the respective lens elements for the d-line, and reference symbols $\nu_1$, $\nu_2$, ... represent Abbe's number of the respective lens elements for the d-line. Furthermore, reference symbols f, $\beta$, WD, NA and ND in the embodiments of the above described high magnification liquid immersion objective lens system represent focal lengths, magnifications, working distances, numeral apertures and refractive indices of immersion liquids for the d-line like those in the first embodiment.

Figure 9:
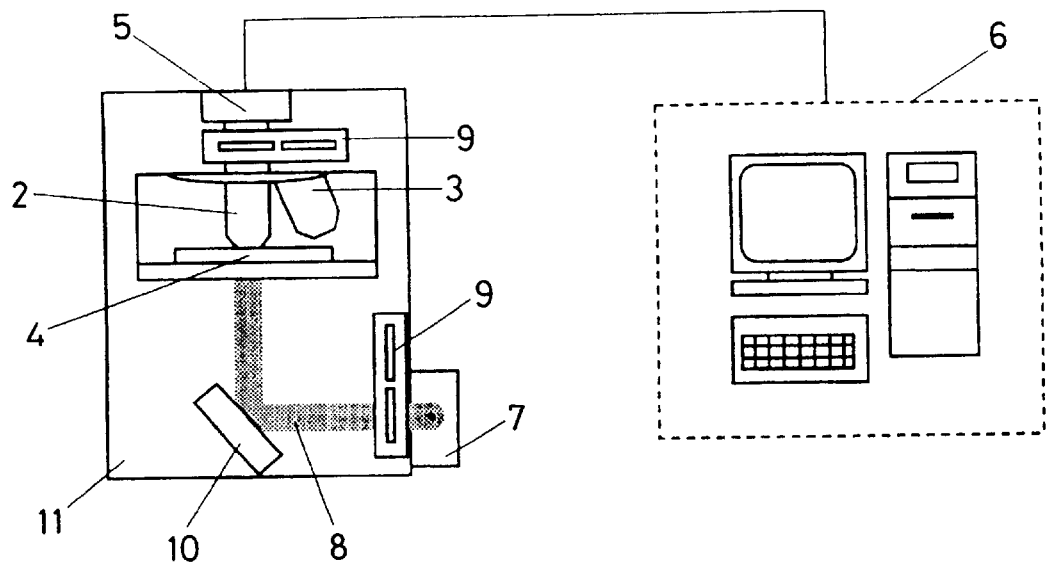

FIG. 9 is diagram showing a third embodiment of the optical apparatus according to the present invention wherein the optical apparatus according to the present invention is applied to a measuring apparatus. Attached to the measuring apparatus 11 shown in FIG. 9 are a low magnification liquid immersion objective lens system 2 and a high magnification liquid immersion objective lens system 3. The measuring apparatus is a gene analyzer which counts genes, for example, on a chromosome. A low magnification liquid immersion objective lens system 2 of the optical apparatus according to the present invention applied to the measuring apparatus is, for example, the objective lens system according to any one of the first through fifth embodiments of the present invention. Furthermore, a high magnification liquid immersion objective lens system 3 is, for example, the first embodiment of the above described high magnification liquid immersion objective lens system. A specimen 4 to be observed is preliminarily dyed with a fluorescent coloring matter. The specimen 4 is illuminated with a light source 7 and emits a fluorescence. A fluorescence image emitted from the specimen 4 is picked up by an image pickup camera 5, recorded and analyzed in a computer 6. Switching between the low magnification liquid immersion objective lens system 2 and the high magnification liquid immersion objective lens system 3, an image pickup timing, switching of a filter wheel 9, and operations of the measuring apparatus 11 and the image pickup camera 5 are controlled by the computer 6.

The third embodiment of the optical apparatus according to the present invention first observes the specimen 4 with the low magnification liquid immersion objective lens system 2 to search for an object to be recorded and analyzed. When the object to be recorded and analyzed is determined, the third embodiment switches the low magnification liquid immersion objective lens system to the high magnification liquid immersion objective lens system 3, picks up an image of the object to be observed with the image pickup camera 5, records and analyzes an image pickup result in the computer 6. Then, the third embodiment switches the high magnification liquid immersion objective lens system 3 to the low magnification liquid immersion objective lens system 2 and observes the specimen 4 once again to search for another object to be recorded and analyzed.

The third embodiment of the optical apparatus according to the present invention does not require wiping off an immersion liquid from a specimen each time the objective lens systems are switched and can observe the specimen quickly.

The third embodiment of the optical apparatus according to the present invention uses, like the first embodiment of the optical apparatus according to the present invention, any one of the first through fifth embodiment shown in FIG. 1 through FIG. 5 as the low magnification liquid immersion objective lens system and employs the first embodiment shown in FIG. 10 as the high magnification liquid immersion objective lens system. Accordingly, the third embodiment of the optical apparatus according to the present invention satisfies the conditions (3), (7) and (7-1) like the optical apparatus according to the first embodiment.

Figure 12:
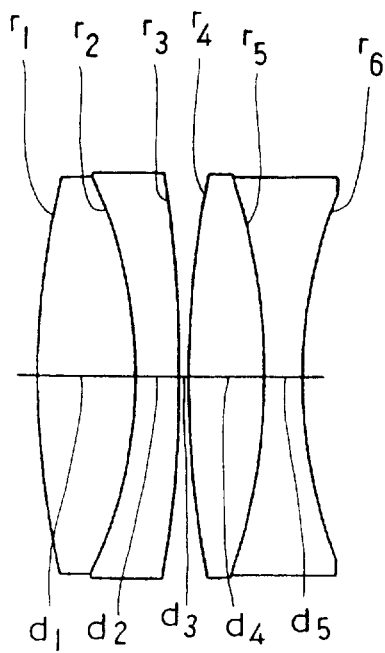
FIG. 12 is sectional view showing an example of imaging lens system to be used in combination of the objective lens system according to the present invention.

Furthermore, the above described objective lens systems are designed for focusing on an infinite distance and used in combination, for example, with the imaging lens system shown in FIG. 12.

Though the above described third embodiment is configured to control the measuring apparatus 11 and the image pickup camera 5 with the computer 6, the computer 6 is not limitative and the measuring apparatus 11 may be configured, for example, to be operated manually.

Though the above described embodiment of the optical apparatus uses the image pickup camera 5 as observing means, the optical apparatus may use, for example, an eyepiece as a visual observing means.

Thought the low magnification liquid immersion objective lens system 2 and the high magnification liquid immersion objective lens system 3 are attached, one each, to the measuring apparatus 11 in the embodiment shown in FIG. 9, it is sufficient for the optical apparatus like the optical apparatus according to the first embodiment to comprise at least the low magnification liquid immersion objective lens system and the high magnification liquid immersion objective lens system one each, and the optical apparatus may be configured to use either or both of the low magnification liquid immersion objective lens system 2 and the high magnification liquid immersion objective lens system 3 in a plurality.

Though the optical apparatus according to the above described embodiment uses the fluorescent coloring material for detecting an image, the optical apparatus may be configured to use a radioactive e material for detecting an image. Furthermore, the optical apparatus may be configured to detect an image by the phase difference detection method, differential interference detection method or darkfield detection method.

Though an immersion liquid oil for microscopes is used as an immersion liquid in each of the above described embodiments since the immersion liquid oil for microscopes is frequently used as an immersion liquid for high magnification objective lens systems, even glycerin mixtures and methylene iodide-based materials are usable in the optical apparatuses so far as these substances are equivalent to the immersion liquid for the high magnification objective lens systems.

The low magnification liquid immersion objective lens system according to any one of the first through fifth embodiments which is used in the optical apparatus according to the third embodiment is an objective lens system designed for focusing on an infinite distance and the first embodiment of the high magnification liquid immersion objective lens system shown in FIG. 10 is also an objective lens system designed for focusing on the infinite distance. Accordingly, these objective lens systems are used in combination, for example, with the above described imaging lens system shown in FIG. 12.

Furthermore, the objective lens system which is designed for focusing on a finite distance which is used in the optical apparatus according to the second embodiment may be used as a high magnification liquid immersion objective lens system. Similarly, an objective lens system designed for focusing on a finite distance may be used also in the optical apparatus according to the first embodiment. Reversely, an objective lens system designed for focusing on an infinite distance may be used as a high magnification liquid immersion objective lens system in the optical apparatus according to the second embodiment.

The high magnification liquid immersion objective lens systems which are used in the above described first and third embodiments of the optical apparatus have a magnification of 100×. Furthermore, the high magnification liquid immersion objective lens system which is used in the second embodiment of the optical apparatus according to the present invention has a magnification of 60×. Taking sizes of chromosomes and genes into consideration, magnifications of 60× to 100× are suited to high magnification liquid immersion objective lens systems which are used for observing chromosomes and genes in cells, but these magnifications are not limitative, and the present invention is applicable to a case where minute information of genes is to be observed at a remarkably high magnifications, for example, of 150× or 200× and a case where the optical apparatus is to be used at a magnification of 20× or 40× in a site meter.

The magnification of the objective lens system used in the above described embodiment is a magnification of a combination of the objective lens system and the imaging lens system when the objective lens system is designed for focusing on the infinite distance or a magnification of the objective lens system alone when the objective lens system is designed for focusing on the finite distance. The optical apparatus according to the present invention can be configured to enhance or lower a magnification with a relay lens system, enlarge or contract an image by electronic zooming with an image pickup appliance or obtain an image with a camera and enlarge or contract the image with a computer.

As understood from the foregoing description, the present invention makes it possible to realize a low magnification liquid immersion objective lens system which has an excellent working property for screening high magnification liquid immersion objective lens systems. Furthermore, the present invention makes it possible to realize and optical apparatus which is suited to automatic inspection apparatuses and uses a low magnification liquid immersion objective lens system.

What is claimed is:

1. A low magnification liquid immersion objective lens system which uses an immersion liquid having a refractive index ND within a range defined by a condition (1) shown below, comprising in order from the object side, a first lens unit having positive refractive power and at least another lens unit, and satisfying the following conditions (2), (3) and (4):

$$1.34 \leq ND \leq 1.80 \tag{1}$$

$$\beta \leq 15 \tag{2}$$

$$WDL \leq 0.35 \text{ mm} \tag{3}$$

$$|f\beta/fG1| \leq 40 \tag{4}$$

wherein a reference symbol $\beta$ represents a magnification of said objective lens system, a reference symbol WDL designates a working distance of said objective lens system, a reference symbol fG1 represents a focal length of the first lens unit and a reference symbol f designates a focal length of said objective lens system.

2. A low magnification liquid immersion objective lens system which uses an immersion liquid having a refractive index ND within a range defined by a condition (1) shown below, comprising in order from the object side, a first lens unit having positive refractive power; a second lens unit having negative refractive power; and a third lens unit having positive refractive power, and satisfying the following conditions (2), (3) and (4):

$$1.34 \leq ND \leq 1.80 \tag{1}$$

$$\beta \leq 15 \tag{2}$$

$$WDL \leq 0.35 \text{ mm} \tag{3}$$

$$|fG3/f| \leq 5 \tag{4}$$

wherein a reference symbol $\beta$ represents a magnification of said objective lens system, a reference symbol WDL designates a working distance of said objective lens system, a reference symbol fG3 represents a focal length of the third lens unit and a reference symbol f designates a focal length of said objective lens system.

3. A low magnification liquid immersion objective lens system which uses an immersion liquid having a refractive index ND within a range defined by a condition (1) shown below, comprising in order from the object side, a first lens unit having positive refractive power; and a second lens unit having negative refractive power, and satisfying the following conditions (2), (3) and (4):

$$1.34 \leq ND \leq 1.80 \tag{1}$$

$$\beta \leq 15 \tag{2}$$

$$WDL \leq 0.35 \text{ mm} \tag{3}$$

$$|f\beta/fG1| \leq 20 \tag{4}$$

wherein a reference symbol $\beta$ represents a magnification of said objective lens system, a reference symbol WDL designates a working distance of said objective lens system, a reference symbol fG1 represents a focal length of the first lens unit, and a reference symbol f designates a focal length of said objective lens system.

4. The liquid immersion objective lens system according to claim 1 comprising a plane parallel plate disposed at an object side location which is to be brought into contact with the immersion liquid.

5. The liquid immersion objective lens system according to claim 2 comprising a plane parallel plate disposed at an object side location which is to be brought into contact with the immersion liquid.

6. The liquid immersion objective lens system according to claim 3 comprising a plane parallel plate disposed at an object side location which is to be brought into contact with the immersion liquid.

* * * * *